(12) United States Patent
Kojima (10) Patent No.: US 7,499,099 B2
(45) Date of Patent: Mar. 3, 2009

(54) ILLUMINATION APPARATUS AND IMAGE-TAKING APPARATUS

(75) Inventor: Nobuhisa Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 11/148,888

(22) Filed: Jun. 8, 2005

(65) Prior Publication Data

US 2005/0275749 A1    Dec. 15, 2005

(30) Foreign Application Priority Data

Jun. 14, 2004    (JP) .............................. 2004-175371

(51) Int. Cl.
*G03B 15/02*    (2006.01)
(52) U.S. Cl. .................... 348/373; 362/16; 362/223; 362/308; 362/328; 348/370
(58) Field of Classification Search ................ 348/370; 362/16, 326, 308, 328
See application file for complete search history.

(56) References Cited

U.S. PATENT DOCUMENTS 4,317,625 A * 3/1982 Van Allen .................. 396/200

FOREIGN PATENT DOCUMENTS

JP    07-270867    * 10/1995
JP    11-273426    10/1999

* cited by examiner

*Primary Examiner*—Sinh N Tran
*Assistant Examiner*—Paul Berardesca
(74) *Attorney, Agent, or Firm*—Cowan, Liebowitz & Latman, P.C.

(57) ABSTRACT

In an illumination apparatus, an optical element has an exit surface in which an inclination to a perpendicular to an irradiation optical axis in a first area is greater than that of a second area, and the inclination of the first area gradually increases in order from the irradiation optical axis, an intermediate part and a periphery of the exit surface. The first and second areas are defined as those divided by an interface surface that includes an irradiation optical axis and is orthogonal to a plane that is orthogonal to a longitudinal direction of the light source. A first reflective surface reflects first light to the intermediate part in the first area. A second reflective surface reflects second light to the periphery in the second area.

5 Claims, 6 Drawing Sheets

PRIOR ART

FIG. 6

PRIOR ART

FIG. 7

ILLUMINATION APPARATUS AND IMAGE-TAKING APPARATUS

BACKGROUND OF THE INVENTION

The present invention relates to an illumination apparatus that irradiates light from a light source, and an image-taking apparatus having the illumination apparatus.

An illumination apparatus for use with a conventional image-taking apparatus, such as a camera, includes a light source, a reflector and an optical element, such as a Fresnel lens, that are used to introduce the light from the light source to a front or subject side.

A variety of proposals have been made to such an illumination apparatus so as to reduce its size and efficiently condense the light that is emitted from the light source in various directions, into a necessary irradiation angle of view. See Japanese Utility-Model Application, Publication No. 2-138733 and Japanese Patent Application, Publication No. 7-270867.

Figure 6:
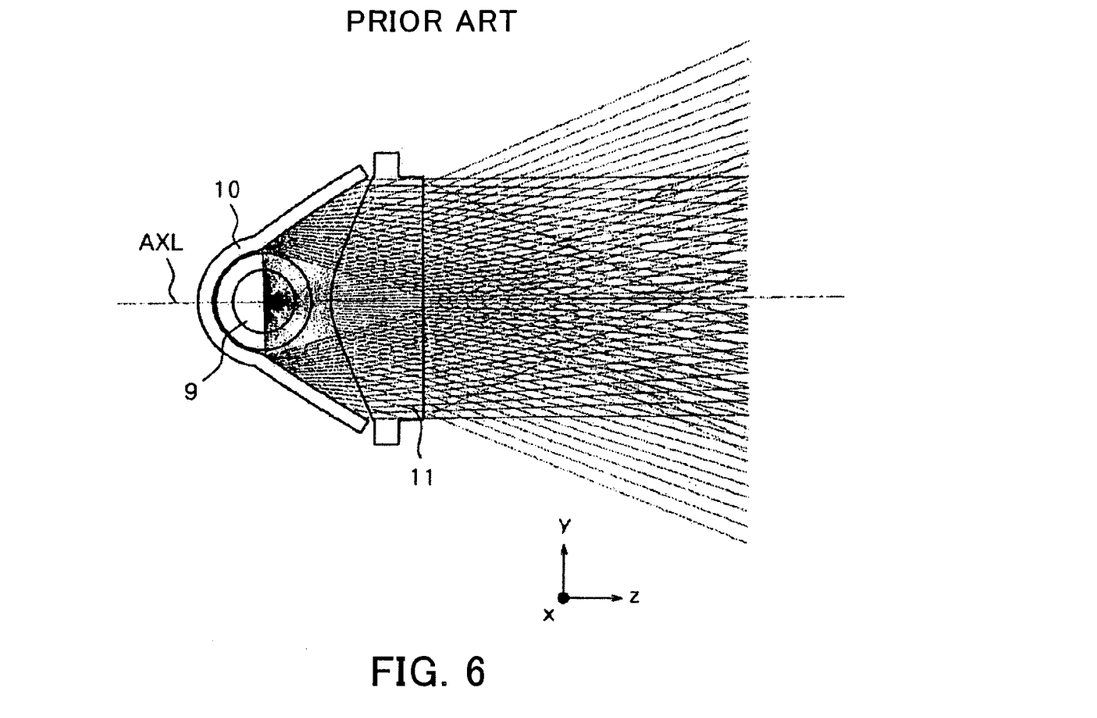
FIG. 6 is a YZ sectional view in a conventional illumination apparatus.

For example, the illumination apparatus shown in FIG. 6 includes a 10 having a reflective surface, and an optical element 11 that has an incident surface and an exit surface. The incident surface is a positive refractive part that provides a positive refractive power to the light near an irradiation optical axis AXL among the lights irradiated from a light source 9 to a subject side. The exit surface exits the light from the incident surface. The reflective surface of the reflector 10 reflects toward the subject the light exited from the light source 9 at an angle apart from the irradiation optical axis AXL. Due to the reflective surface, rays approximately perpendicular to the irradiation optical axis AXL among the lights emitted from the light source 9 at a predetermined angle or larger from the irradiation optical axis AXL are incident upon the optical element 11, and then exited from the optical element 11 as exit rays at necessary angles to the irradiation optical axis AXL. The rays reflected on the tip of the reflective surface and then exited from the optical element 11 are approximately parallel to the irradiation optical axis AXL.

This illumination apparatus is a small and efficient one, because it can be made small in the height and length directions.

Along with the recent diversified camera body designs, many cameras' exterior members have complicated curved surfaces, e.g., gradually changing curvatures. When the camera body's exterior shape is configured by a complicated curved surface, it is preferable for an attractive appearance that an illumination optical system's surface that is closest to the light irradiation or subject side also has a stepless curved surface adjusted to the camera body's shape.

However, the conventional camera having the illumination optical system is problematic in poor design freedom of the camera body.

For example, the illumination apparatus disclosed in Utility-Model Application, Publication No. 2-138733 decenters a surface of the Fresnel lens on the subject or light irradiation side. However, as the rotationally central axis of the Fresnel lens is perpendicular to the Fresnel surface similar to prior art, the illumination optical system disclosed in this reference has a limit to correct a parallax with an optical axis of the image-taking lens and cannot increase the design freedom of the camera body.

In the illumination apparatus disclosed in Japanese Patent Application, Publication No. 7-270867, the Fresnel lens surface on the subject or light irradiation side is oblique to the optical axis of the image-taking lens. The Fresnel lens surface on the light source side is composed of cylindrical surfaces of plural Fresnel elements each having a cylindrical surface. At least one of the Fresnel angle of each Fresnel element and the cylindrical surface shape vary among the Fresnel elements in accordance with the inclination of the Fresnel lens surface on the light irradiation side to the optical axis of the image-taking lens, and correct the light bias caused by an inclination of the Fresnel lens's surface on the illumination range side.

Nevertheless, the illumination optical system in this reference discusses only the Fresnel lens shape and is silent of a reflector shape.

Figure 7:
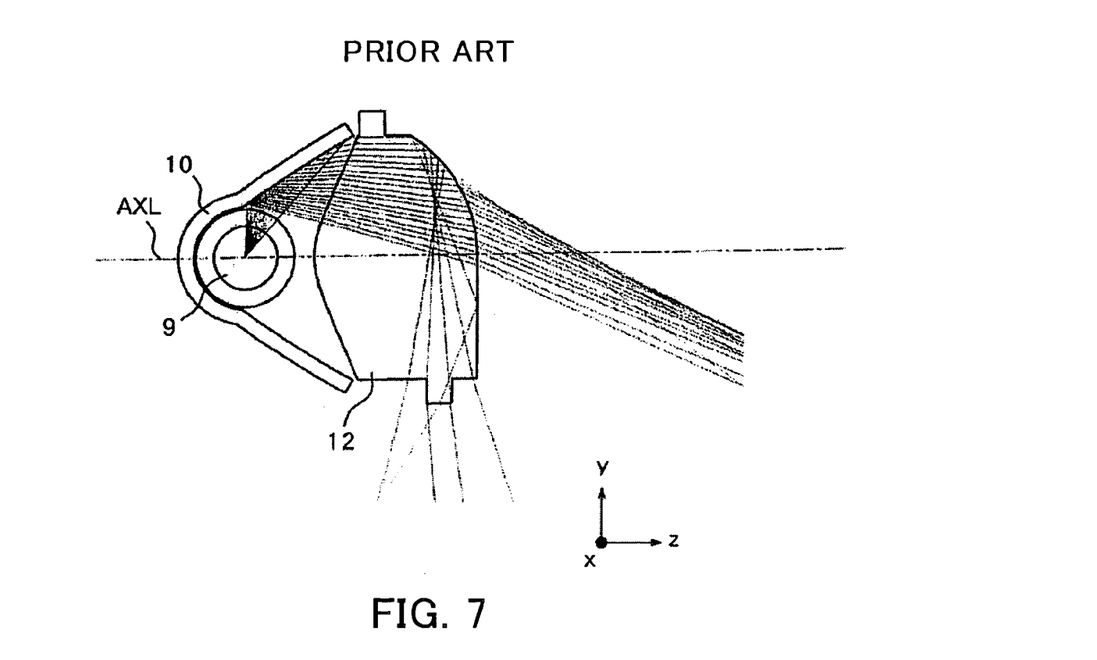
FIG. 7 is the YZ sectional view in the conventional illumination apparatus.

When the optical element 11 in the illumination apparatus shown in FIG. 6 is replaced with an optical element 12 having an exit surface that is designed to have a large curvature R as shown in FIG. 7, part of the light reflected by the reflector 10 among the lights from the light source 9 is totally reflected on the exit surface of the optical element 12, does not reach the subject, and can lower the light intensity on the subject. The exited light spreads little, converges in a certain direction, and also causes the non-uniform light distribution.

BRIEF SUMMARY OF THE INVENTION

It is one exemplary object of the present invention is to provide an illumination apparatus and an image-taking apparatus having the same, which have a wide design freedom of the exit surface shape, and provide an approximately uniform light distribution characteristic to a necessary irradiation range.

An illumination apparatus according to one aspect of the present invention includes a light source, an optical element for directing light from the light source to an irradiation direction, the optical element having incident and exit surfaces, and a reflector for directing the light from the light source to the irradiation direction, the reflector having first and second reflective surfaces, wherein first and second areas are defined as those divided by an interface surface that includes an irradiation optical axis and is orthogonal to a plane that is orthogonal to a longitudinal direction of the light source, wherein an inclination of the exit surface in the first area on the plane to a direction orthogonal to the irradiation optical axis is greater than that in the second area, and the inclination in the first area on the plane gradually increases in order from the irradiation optical axis, an intermediate part and a periphery, wherein the first reflective surface reflects to the exit surface first light that directs from the light source to the periphery outside the incident surface in the first area on the plane, and the second reflective surface reflects to the exit surface second light that directs from the light source to the periphery outside the incident surface in the second area on the plane, wherein the first reflective surface reflects the first light to the intermediate part in the first area on the exit surface instead of reflecting the first light to the periphery in the first area on the exit surface, and wherein the second reflective surface reflects the second light to the periphery in the second area on the exit surface.

Other objects and further features of the present invention will become readily apparent from the following description of the preferred embodiments with reference to accompanying drawings.

DETAILED DESCRIPTION OF THE PREFERRED EMBODIMENTS

Figure 1:
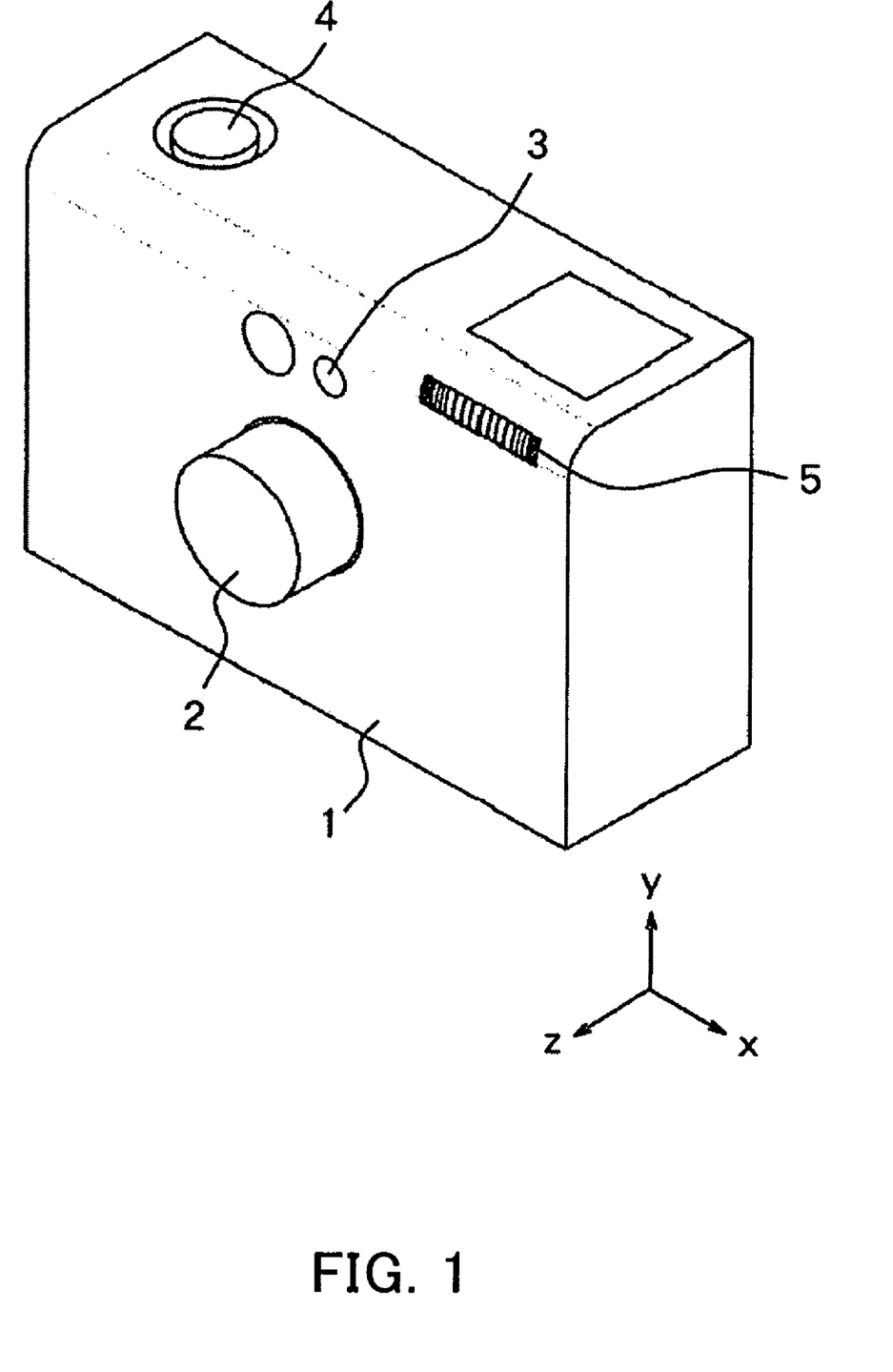
FIG. 1 is a front perspective view of a camera according to one embodiment of the present invention.
Figure 2:
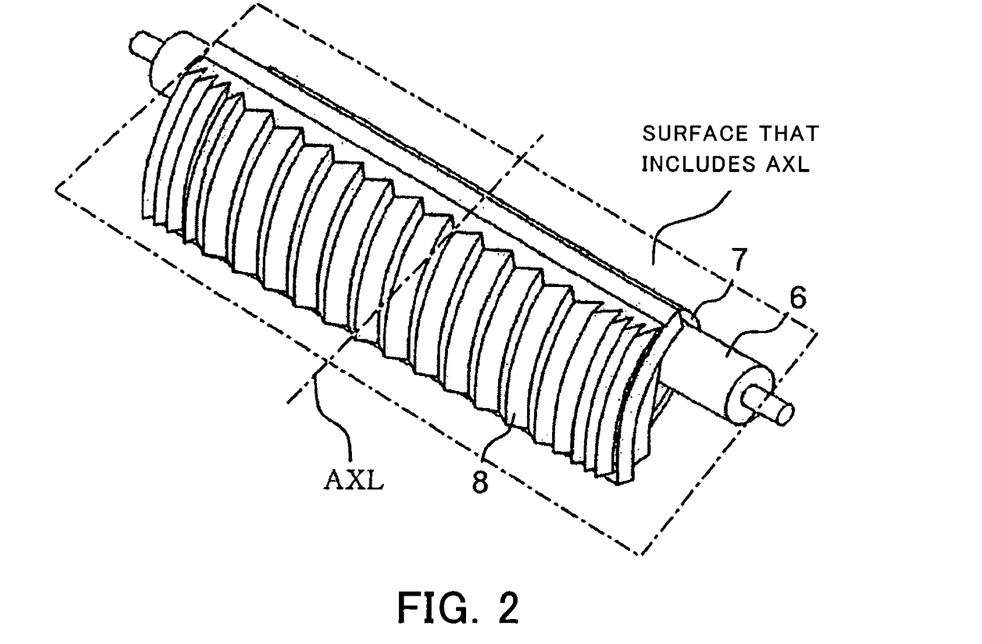
FIG. 2 is a perspective view of an illumination apparatus assembled in the camera according to this embodiment.
Figure 3:
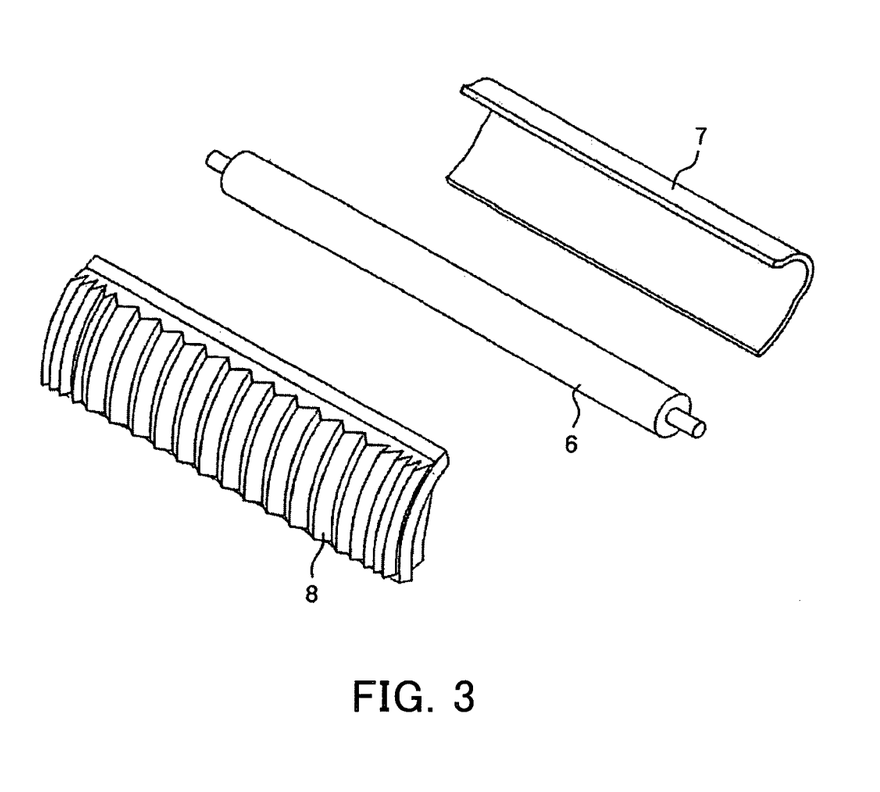
FIG. 3 is an exploded perspective view of the illumination apparatus according to this embodiment.

Referring now to FIGS. 1 to 5, a description will be given of one embodiment of the present invention. FIG. 1 is a front perspective view of a camera as an image-taking apparatus. FIG. 2 is a perspective view of an illumination apparatus assembled in the camera. FIG. 3 is an exploded perspective view of FIG. 2. FIGS. 4A, 4B, 5A and 5B show an optical arrangement of optical components in the illumination apparatus.

In these figures, 1 denotes a camera body, and has a zooming lens barrel 2 at its front center. The lens barrel 2 holds an image-taking lens, such as a zooming lens (not shown) and a focusing lens, and provides zooming and focusing as it moves back and forth in the optical axis direction.

3 denotes a finder provided above the lens barrel 2. 4 denotes a release button provided on a top surface of the camera body 1. A first stroke operation of the release button 4 starts an image-taking preparatory action, such as a focus detection and a photometric action, and a second stroke operation of the release button 4 starts an image-taking action, such as exposure to the image-pickup device, such as a CCD sensor and a CMOS sensor, and recording of an image signal output from the image-pickup device down to a recording medium.

5 denotes an illumination apparatus assembled at an upper right attachment area of the camera front surface. The inventive mechanical structural components are not limited to this configuration.

A description will now be given of the illumination apparatus with reference to FIGS. 2, 3, 4A, 4B, 5A and 5B.

The illumination apparatus 5 includes a cylindrical flash discharge tube or light source 6 that emits the light, a reflector 7, and an optical element or prism 8. The reflector 7 reflects toward the subject the light that is emitted in a backward direction (opposite to the subject) rather than in a forward direction (toward the subject or light irradiation side) among the lights emitted from the flash discharge tube 6. The optical element 8 is made of a transparent material, and efficiently introduces to the subject the light directly incident from the flash discharge tube 6 and the incident light reflected on the reflector 7.

In FIGS. 2 and 3, the optical element 8 has on the subject side a prism surface that controls the light distribution characteristic in the lateral or X direction. Control over the light distribution characteristic in the longitudinal or Y direction to a desired light intensity distribution uses incident and exit surfaces of the optical element 8 for receiving the light exited near an irradiation optical axis AXL among the lights emitted in the forward direction, and the light reflected by the reflector's reflective surface, and for converting the light into a desired light distribution characteristic by the refractive operation, and a reflective surface for mainly reflecting the light exited in a direction orthogonal to the irradiation optical axis AXL and for introducing the reflected light to the optical element 8.

This embodiment sets appropriate shapes to the optical element 8 and the reflector 7 so as to optimize the light distribution characteristic in the longitudinal or Y direction.

Figure 4A:
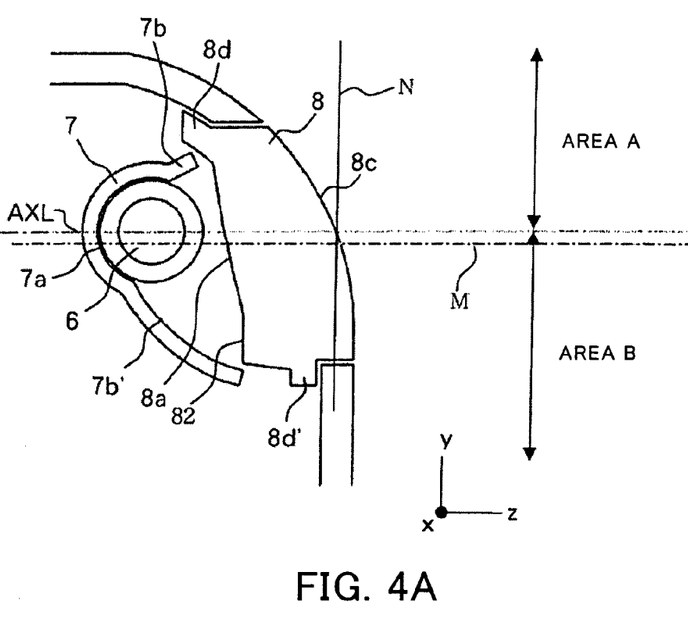
FIG. 4A is a YZ sectional view of the illumination apparatus according to this embodiment.

As shown in FIG. 4A, the optical element 8 has an incident surface 8a upon which the light emitted from a light source is incident, and an exit surface 8b from which the light that has transmitted the incident surface 8a is exited. The incident surface 8a includes a first incident surface 81 that has a positive refractive power and includes the irradiation optical axis AXL and its vicinity, and a second incident surface 82 that extends from the first incident surface 81 in an area B, which will be described later, in a direction approximately orthogonal to the irradiation optical axis AXL.

The first incident surface 81 is an aspheric cylindrical lens surface. The light that has a relatively small angle relative to the irradiation optical axis AXL (which angle is smaller than a first angle) among the lights from the light source center is directly incident upon the cylindrical lens surface. The cylindrical lens surface condenses the light.

The light that has been reflected mainly on a second reflective surface 7b' on the reflector 7 among the lights from the light source center is incident upon the second incident surface 82.

The exit surface 8c has a curvature adjusted to the exterior shape of the camera body 1. An area A (or first area) is defined as an area above a surface that has the irradiation optical axis AXL and is perpendicular to a longitudinal direction of the flash discharge tube 6, which surface is referred to as an interference surface, and an area B (or second area) is defined as an area below the interference surface. The curvature of the exit surface 8c is set so that an inclination of the exit surface 8c in the area A to a perpendicular N that is orthogonal to the irradiation optical axis AXL is greater than that in the area B.

Figure 4B:
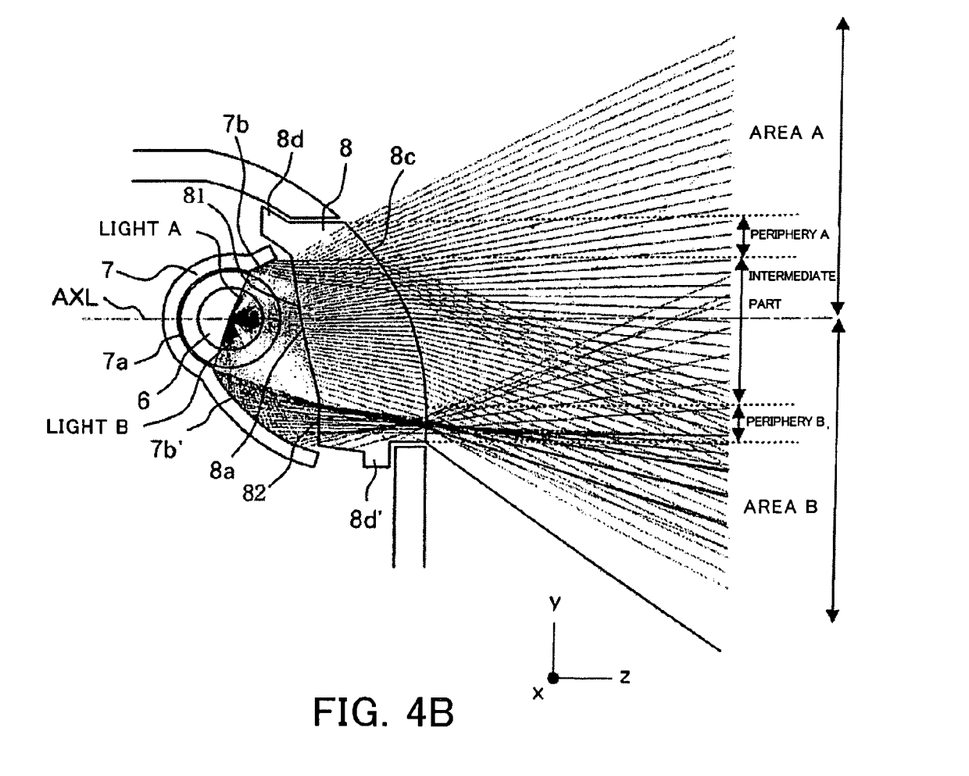
FIG. 4B is a ray tracing view on the YZ section in the illumination apparatus according to this embodiment.

As shown in FIG. 4B, the exit surface 8c is segmented into an intermediate part that includes the irradiation optical axis AXL and is an orthogonal projection of the first incident surface 81 in the irradiation optical axis direction, a periphery A that is located above the intermediate part in the area A, and a periphery B that is located below the intermediate part in the area B. The exit surface 8c is shaped so that the inclination to the perpendicular N gradually increases in a direction separating from the irradiation optical axis AXL or in order from the irradiation optical axis AXL, the intermediate part and the periphery A in the area A. The periphery A is located closer to the irradiation axis AXL than the periphery B.

The optical element 8 is made of a high-transmittance optical resin or a glass material, such as acrylic resin.

The reflector 7 has an inner, high-reflectance surface made of a metallic material, such as bright aluminum, or an inner, high-reflectance, metallic evaporated surface made of a resin material, etc.

In the thus-structured camera body 1, the CPU (not shown) determines whether the illumination apparatus 5 is to emit the light, based on the object brightness measured by the photometric unit (not shown) and a measurement result of the image-pickup device (e.g., a CCD sensor or a CMOS sensor), in the camera body 1 or the sensitivity of the installed film in the first stroke action (or half-press action) of the release button 4, for example, when the camera is set to a "flash automatic mode".

When determining that the "illumination apparatus is to emit the light" under the current image-taking condition, the CPU instructs to take a picture (and record the image), outputs an emission signal, and allows the flash discharge tube 6 via a trigger lead (not shown) attached to the reflector 7, in response to the second stroke action (or full-press action) of the release button 4.

Among the emitted lights, light B emitted in a direction opposite to the subject is incident upon the optical element 8 via the reflector 7, and light A emitted toward the subject is directly incident upon the optical element 8. These lights A and B are converted into a predetermined light distribution characteristic via this optical element 8, and then irradiated onto the subject.

Figure 5A:
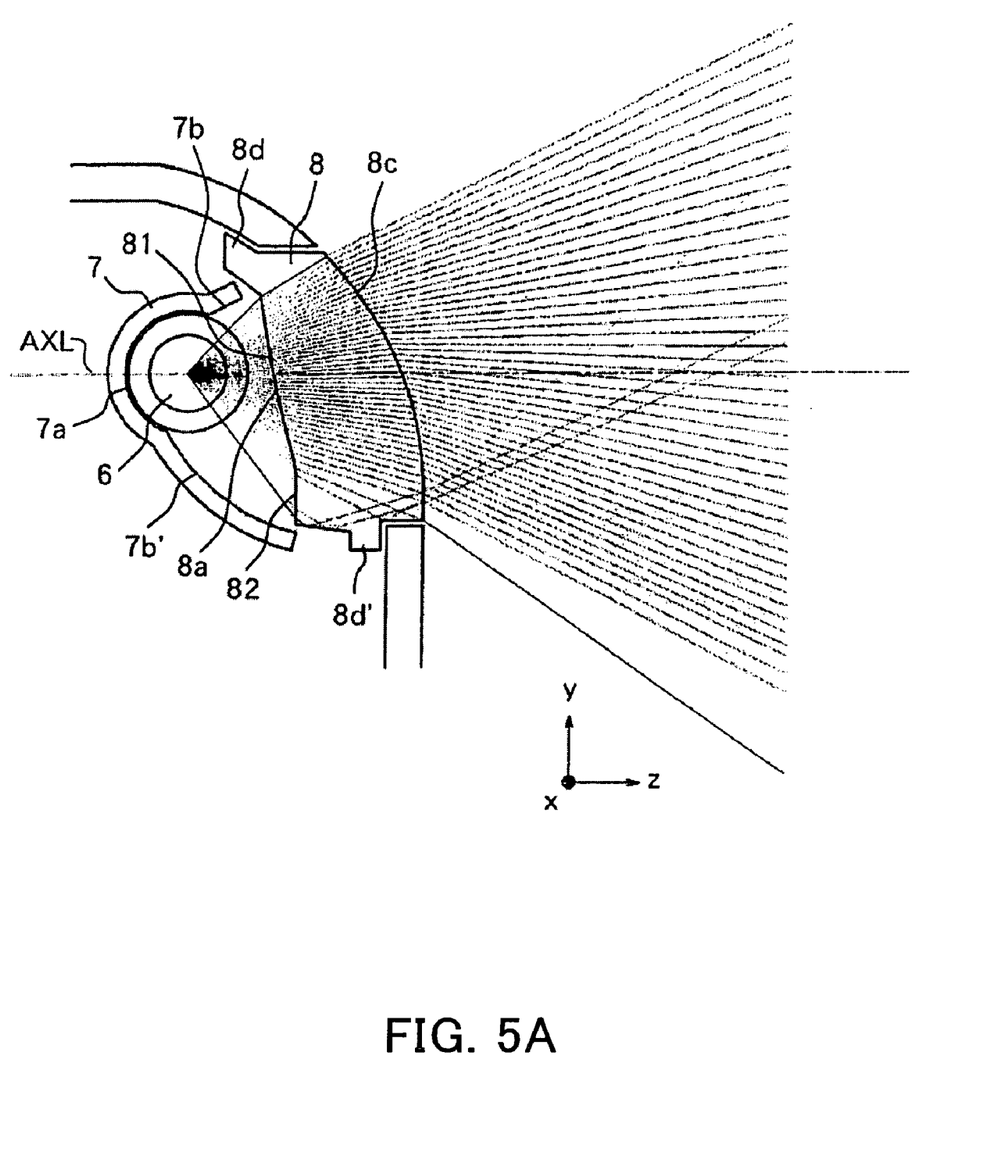
FIG. 5A is a ray tracing view on the YZ section in the illumination apparatus according to this embodiment.
Figure 5B:
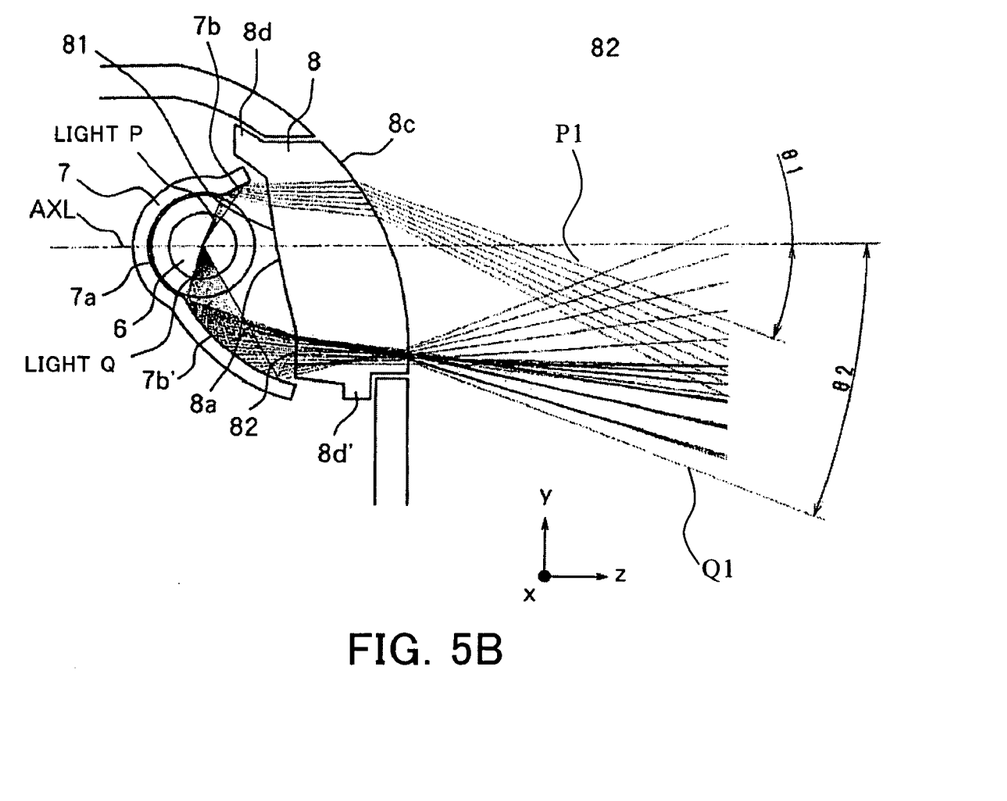
FIG. 5B is a ray tracing view on the YZ section in the illumination apparatus according to this embodiment.

A detailed description will be given of a structure that determines an optical performance of the illumination apparatus with reference to FIGS. 4A, 4B, 5A and 5B. Here, FIG. 4B is a ray tracing view that shows an optical path for the light emitted from the light source 6 through respective surfaces of the reflector 7 and the optical element 8. FIG. 5A is a ray tracing view of the light directly incident upon the optical element 8 among the lights from the light source 6. FIG. 5B is a ray tracing view of the light incident upon the optical element 8 among the lights from the light source 6 after the light is reflected on the reflector 7.

In FIGS. 4A, 4B, 5A and 5B, the flash discharge tube 6 often emits the light throughout the inner diameter for improved efficiency, and may be considered to emit the light approximately uniformly from the light emitting point having the inner diameter of the discharge tube. However, for description convenience, the light emitted from the light source center is regarded as representative light and these figures show only the light emitted from the light source center. Although the actual light distribution characteristic entirely changes in a slightly spreading direction due to the light emitted from the periphery of the discharge tube in addition to the illustrated representative light, the actual light distribution characteristic is almost equal to the representative light's one. Therefore, the following description follows this representative light.

First, as shown in FIG. 4A, the flash discharge tube 6 is decentered above (in a direction that increases the gradient of the R-shaped exit surface of the optical element) with respect to a centerline M that passes the center of the aperture height of the illumination apparatus 5. This is to increase the light that passes part of the exit surface 8c having a smaller gradient and to reduce the total reflection on the exit surface 8c.

Next, part of the reflector 7 that covers the back of the flash discharge tube 6 or a half-cylindrical part 7a has a semi-cylindrical shape and is approximately concentric to the flash discharge tube 6. This is an effective shape to return the reflected light on the reflector 7 to a vicinity of the center of the light source, and is less affected by the influence of the refraction at the glass part of the flash discharge tube 6. The above configuration allows the reflected light from the reflector 7 to be regarded as the light directly exited from the light source, and can make the entire illumination optical system small.

The half-cylindrical part 7a is rotated in a clockwise direction around the light source center on the paper surface, so as to reduce the light exited to the upper front side of the paper surface and shorten the reflective surface of the reflector 7, as described later.

First and second reflective surfaces 7b and 7b' extend from the upper and lower ends of the half-cylindrical part 7a of the reflector 7, and the first reflective surface 7b is set smaller than the second reflective surface 7b'.

The first reflective surface 7b reflects the light P (or a first ray) to the intermediate part in the area A instead of reflecting it to the periphery A of the exit surface 8c, where the light P directs from the light source to the outside of the incident surface 8a in the area A. The second reflective surface 7b' reflects the light Q (or a second ray) to the periphery B of the exit surface 8c, where the light Q directs from the light source to the outside of the second incident surface 82 in the area B.

The light P reflected on the first reflective surface 7b is not exited from the periphery A of the exit surface 8c, which has a large inclination to the perpendicular N. This configuration reduces a ratio of the light P that is totally reflected on the exit surface 8c and does not reach the subject. The size of the reflective surface 7b is set small so that the light P does not direct to the periphery A.

The second reflective surface 7b' extends close to the optical element 8 so as to reflect the light that is emitted below.

The light Q reflected on the second reflective surface 7b' is exited to the subject without being totally reflected, as the light Q is reflected on the periphery B on the exited surface 8c, which has a small inclination to the perpendicular N, as described later.

The exit surface 8c of the optical element 8 is an R surface that has a curvature adjusted to the exterior shape of the camera body 1, and the light emitted from the flash discharge tube 6 irradiates the object with a uniform light distribution via the incident surface 8a and the reflector 7.

A more concrete description will now be given of the reflector 7 and the optical element 8 of the present invention.

First, the optical element 8 is preferably made of an optical resin material, such as acrylic resin, for molding convenience and cost reductions. However, this type of illumination apparatus 5 generates a large amount of heat with the light irradiation from the light source, and requires a proper selection of the optical material and a design of the heat radiation space after consideration of the heat energy generated for one irradiation and the shortest light emitting period.

Indeed, the first incident surface 81 of the optical element 8 closest to the light source is most subject to the heat influence, and the minimum distance d between the light source and the first incident surface 81 is set. When the minimum distance d between the light source and the first incident surface 81 is too large, the entire illumination optical system becomes bulk. The minimum distance d is preferably meets the following equation, where Φ is a diameter of the flash discharge tube 6:

$$\Phi/10 \leq d \leq \phi/2 \qquad (1)$$

This equation can prevent the heat generated from the light source from damaging the first incident surface 81.

Next, the shape of the first incident surface 81 is set. In order to make a uniform light distribution in a necessary irradiation range using a small shape, this embodiment sets the shape of the first incident surface 81 such that there is a certain correlation between the light exit angle from the light source center and the exit angle from the exit surface 8c of the optical element 8.

As shown in FIG. 5A, the light emitted from the light source center is converted into a uniform light distribution on the subject due to the first incident surface 81 and the exit surface 8c (that has a R surface with a curvature adjusted to the exterior shape of the camera body 1) of the optical element 8. The exited light has a predetermined irradiation angle in a direction orthogonal to the irradiation optical axis AXL.

As shown in FIG. 5B, the illumination optical system is set so that the light reflected on the interface between the first reflective surface 7b and the half-cylindrical part 7a has the maximum irradiation angle among the lights P reflected on the first reflective surface 7b on the reflector 7.

The light Q reflected on the second reflective surface 7b' on the reflector 7 is converted into the light that spreads orthogonal to the irradiation optical axis AXL. In this embodiment, the light reflected on the tip of the second reflective surface 7b' (or the end that is farthest from the light source) has the maximum angle to the upper side on the paper surface.

As shown in FIG. 5B, θ1 is approximately equal to θ2, where θ1 is an angle between the first light P1 and the irradiation optical axis AXL, θ2 is an angle between (an extension of) the second light Q1 and the irradiation optical axis AXL, the first light P1 is the light reflected at the tip of the first reflective surface 7b (or the end farther from the light source) and exited from the exit surface 8c, and the second light Q1 is the light reflected at a position of the second reflective surface 7b' closest to the light source and exited from the exit surface 8c. Thus, the lights reflected on the first and second reflective surfaces 7b and 7b' on the reflector 7 among the lights emitted from the light source center are continuous and provide approximately uniform light distribution characteristics on the subject.

As discussed, the light emitted near the irradiation optical axis AXL and the lights P and Q emitted apart from the optical axis provide approximately uniform light distribution via the optical member 8 and the reflections on the reflector 7.

Therefore, the camera's illumination apparatus 5 preferably meets the following equation, unless a special light distribution is required:

$$0.8 \leq |\beta max/\alpha max| \leq 1.2 \qquad (2)$$

where αmax is the maximum angular component of the light refracted on the first incident surface 81, βmax is the maximum angular component of the light that is reflected on the reflective surfaces 7b and 7b' and refracted on the first incident surface 81.

Thereby, as shown in FIGS. 4A to 5B, the exit components of the lights are emitted from the light source center above the irradiation optical axis, and uniformly exited from the exit surface 8c of the optical element 8, while the components are uniformly segmented in accordance with the exit angles, and form an intensity distribution different from the components emitted close to the irradiation optical axis.

A description will be given of an optical path of the light emitted from the flash discharge tube 6, which travels backwardly along the irradiation optical axis, although this optical path is not specifically illustrated. The half-cylindrical part 7a is located at the back of the irradiation optical axis AXL, and the flash discharge tube 6 and the half-cylindrical part 7a are concentrically formed. Therefore, all of the lights emitted backwardly from the light source center return to the light source center without being affected by the refractions by the glass tube of the flash discharge tube 6. Therefore, the behavior of the light that has returned to the light source center has similar characteristics as in the ray tracing in FIGS. 4B, 5A and 5B.

Thus, this embodiment sets the surface shapes such that the lights emitted near and apart from the irradiation optical axis have approximately similar and uniform light distributions as a result of the conversions by the optical element 8 and the reflector 7. As a result, this embodiment provides a small and extremely efficient illumination optical system with few light intensity loss caused by the light irradiations onto the necessary irradiation range.

In the actual light distribution characteristic, the inner diameter size of the effective light-emitting part of the light source is not usually negligibly small and affects the entire light distribution. The finite size of the light source provides the light distribution with a predetermined spread, and the shape determination should consider this factor.

As shown in FIGS. 4A to 5B, the optical element 8 has thin ribs 8d and 8d' on the entire reflective surface of the optical prism over its circumference as in an actual product.

These ribs adjust the optical element 8 to the exterior member, and hide the internal components from the outside through an aperture between the optical element 8 and the exterior member in addition to the following purposes:

These ribs prevent a trigger leakage and lack of light emissions between the metal reflector 7 and the metal cover as the exterior member or a conductive member in an extension of the aperture between the optical element 8 and the exterior member.

In general, the illumination apparatus directly provides a high-voltage trigger signal to the reflector 7, and starts the light emission via a Nesa-coat part of the flash discharge tube 6 that contacts the reflector 7. A small distance between the reflector and the metallically molded exterior member or the conductive member provided outside the product causes the trigger leakage in the small illumination optical system as in this embodiment.

When the ribs 8d and 8d' are added to the optical element 8 at the extension over the reflective surface, the edge surface distance extends and the trigger leakage can be prevented.

At the same time, these ribs 8d and 8d' prevent intrusions of dust and water and a danger of short-circuit of the internal high-voltage components due to the water.

While this embodiment sets an aspheric cylindrical lens surface to the first incident surface formed at the center of the optical element 8, this cylindrical lens surface is not necessarily limited to an aspheric surface but may be a cylindrical surface or a toric lens surface in view of the light condensing characteristic of the discharge tube in its longitudinal direction.

A similar effect to the light distribution obtained from the above shape is obtained, for example, from one or more plane or cylindrical surfaces or quadric surface, such as an ellipse, that approximate the above shape.

When the optical element 8 and the reflector 7 have such approximated shapes, a determination of whether the actually processed shape follows a design value becomes easier than that using the aspheric optical element 8 and 7.

Thus, this embodiment provides an illumination apparatus and an image-taking apparatus having the same, which have a wide design freedom of the exit surface shape, and an approximately uniform light distribution characteristic to a necessary irradiation range.

While this embodiment describes an illumination apparatus built in the camera, the present invention is applicable to the illumination apparatus externally attached to the camera.

This application claims a foreign priority based on Japanese Patent Application No. 2004-175371, filed on Jun. 14, 2004, which is hereby incorporated by reference herein.

What is claimed is:

1. An illumination apparatus for image-taking comprising:
a light source which is a flash discharge tube;
an optical element which directs light from the light source to an irradiation direction, said optical element having incident and exit surfaces; and
a reflector which directs the light from said light source to the irradiation direction, said reflector having a half-cylindrical part that covers a back of the light source and is concentric to the light source, and first and second reflective surfaces that respectively extend from first and second circumferential ends of the half-cylindrical part, wherein first and second areas are defined on a first plane as those divided by a second plane, the first plane being orthogonal to a longitudinal direction of the light source and including an irradiation optical axis, and the second plane being orthogonal to the first plane and including the irradiation optical axis, wherein an inclination of the exit surface in the first area to a direction orthogonal to the irradiation optical axis is greater than that in the second area, and the inclination in the first area gradually increases in order from the irradiation optical axis, an intermediate part and a periphery, wherein the light source is decentered to the first area with respect to a centerline that passes a center of an aperture height of the optical element, and the half-cylindrical part is rotated such that the first circumferential end is closer to the optical element than the second circumferential end, the first reflective surface being shorter than the second reflective surface, wherein the first reflective surface reflects to the exit surface first light that proceeds from said light source to the periphery outside the incident surface in the first area, and the second reflective surface reflects to the exit surface second light that proceeds from said light source to the a periphery outside the incident surface in the second area, wherein the first reflective surface reflects the first light to the intermediate part in the first area on the exit surface instead of reflecting the first light to the periphery in the first area on the exit surface, and wherein the second reflective surface reflects the second light to the periphery in the second area on the exit surface instead of reflecting the second light to the intermediate part in the second area on the exit surface.

2. An illumination apparatus according to claim 1, wherein an angle between the irradiation optical axis and a first ray that is reflected at a position on the first reflective surface farthest from said light source, and exited from the exit surface is substantially equal to an angle between the irradiation optical axis and a second ray that is reflected at a position on the second reflective surface nearest said light source, and exited from the exit surface.

3. An illumination apparatus according to claim 1, wherein the incident surface at least partially has a positive refractive power.

4. An illumination apparatus according to claim 1, wherein a periphery of the incident surface in the first area is closer to the light source than a periphery of the incident surface in the second area in an irradiation optical axis direction.

5. An image-taking apparatus comprising:
an illumination apparatus according to claim 1; and
an image-taking system for taking a picture of a subject illuminated by said illumination apparatus.

* * * * *